(12) United States Patent
Eftimakis

(10) Patent No.: US 6,212,205 B1
(45) Date of Patent: Apr. 3, 2001

(54) METHODS OF GENERATING A DATA STREAM, METHODS OF VALIDATING AN INTEGRATED CIRCUIT, AND METHODS OF COMMUNICATING A DATA STREAM

(75) Inventor: Michel Eftimakis, Antibes (FR)

(73) Assignee: VLSI Technology, Inc., Sunnyvale, CA (US)

(*) Notice: Subject to any disclaimer, the term of this patent is extended or adjusted under 35 U.S.C. 154(b) by 0 days.

(21) Appl. No.: 08/805,279

(22) Filed: Feb. 25, 1997

(51) Int. Cl.$^7$ ........................................................ H04J 3/06
(52) U.S. Cl. ............................ 370/510; 370/470; 375/366
(58) Field of Search ................................... 370/470, 472, 370/503, 509, 510, 511, 512, 513, 514; 375/364, 365, 366

(56) References Cited

U.S. PATENT DOCUMENTS

| | | | |
|---|---|---|---|
| 5,193,091 | * 3/1993 | Crisler et al. | 370/336 |
| 5,212,684 | 5/1993 | MacNamee et al. | 370/24 |
| 5,278,833 | * 1/1994 | Crisler et al. | 370/348 |
| 5,412,650 | 5/1995 | Davies | 370/82 |
| 5,416,778 | * 5/1995 | Chan et al. | 370/330 |
| 5,418,838 | 5/1995 | Havermans et al. | 379/60 |
| 5,459,873 | 10/1995 | Moore et al. | 455/277 |
| 5,544,226 | 8/1996 | Weis et al. | 379/61 |
| 5,570,370 | * 10/1996 | Lin | 370/347 |
| 5,732,356 | * 3/1998 | Bolt | |
| 5,754,537 | * 5/1998 | Jamal | 370/330 |
| 5,809,015 | * 9/1998 | Elliot et al. | 370/337 |

OTHER PUBLICATIONS

Product Brochure: "Digital Enhanced Cordless Telecommunications (DECT)," XSYS New Media Technologies Group, May, 1996; pp. 1–33.
ETSI Publication: "Radio Equipment and Systems (RES); Digital European Cordless Telecommunications (DECT) Common interface Part 1: Overview," European Telecommunications Standards Institute, Oct., 1992; pp. 1–30.
ETSI Publication: "Radio Equipment and Systems (RES); Digital European Cordless Telecommunications (DECT) Common interface Part 2: Physical layer," European Telecommunications Standards Institute, Oct., 1992; pp. 1–39.
Gibson, Jerry D., *The Communications Handbook*, CRC Press 1997, pp. 1305–1326.

* cited by examiner

Primary Examiner—Hassan Kizou
Assistant Examiner—Daniel Previl
(74) Attorney, Agent, or Firm—Wells, St. John, Roberts, Gregory & Matkin, P.S.

(57) ABSTRACT

The present invention provides a method of generating a data stream comprising: generating a first slot having a first data field; generating a second slot; and providing the second slot within the first data field of the first slot. The present invention additionally provides methods of validating an integrated circuit and communicating a data stream.

23 Claims, 6 Drawing Sheets

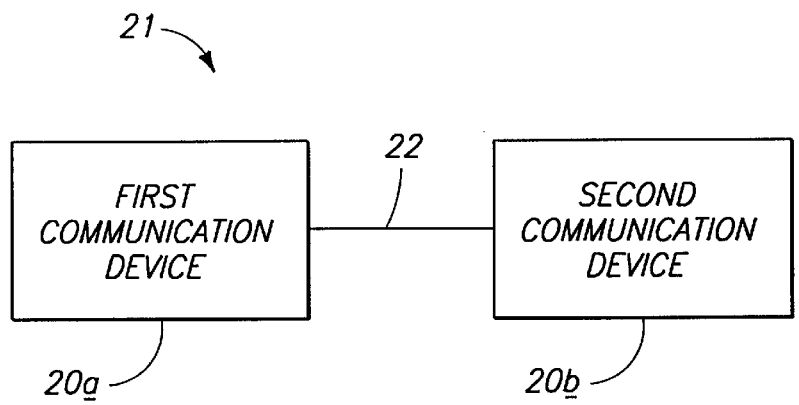
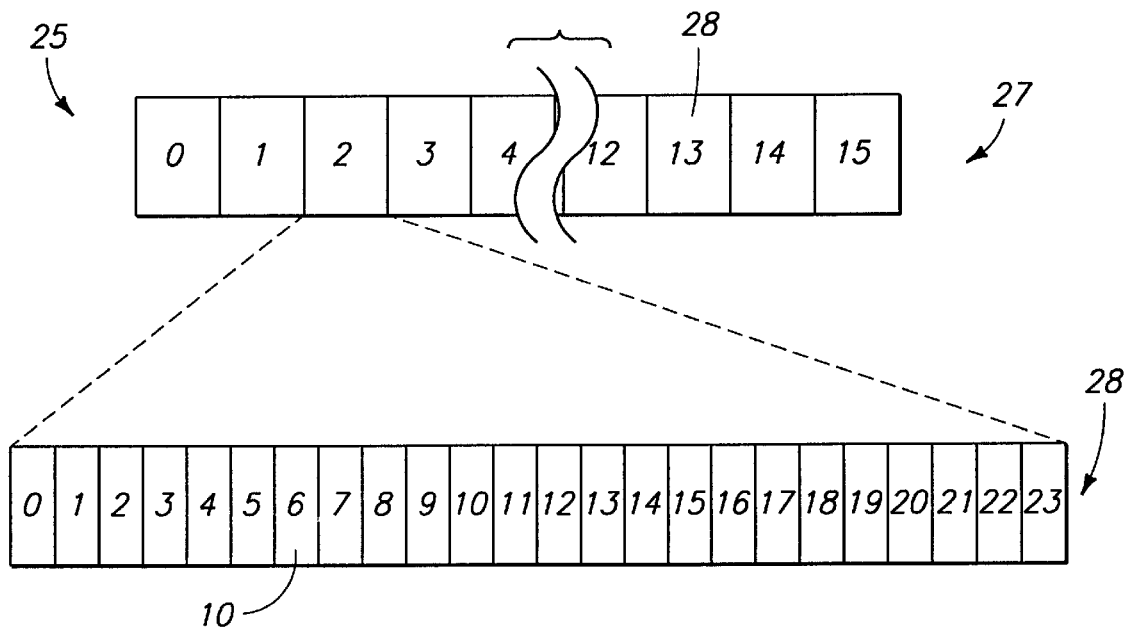

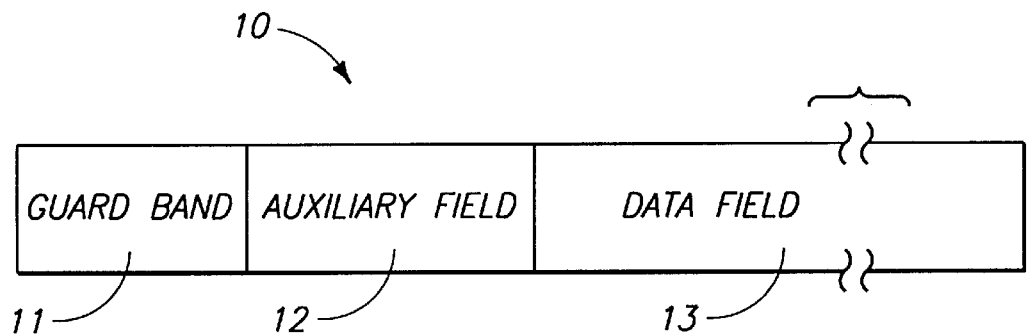
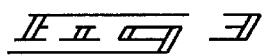
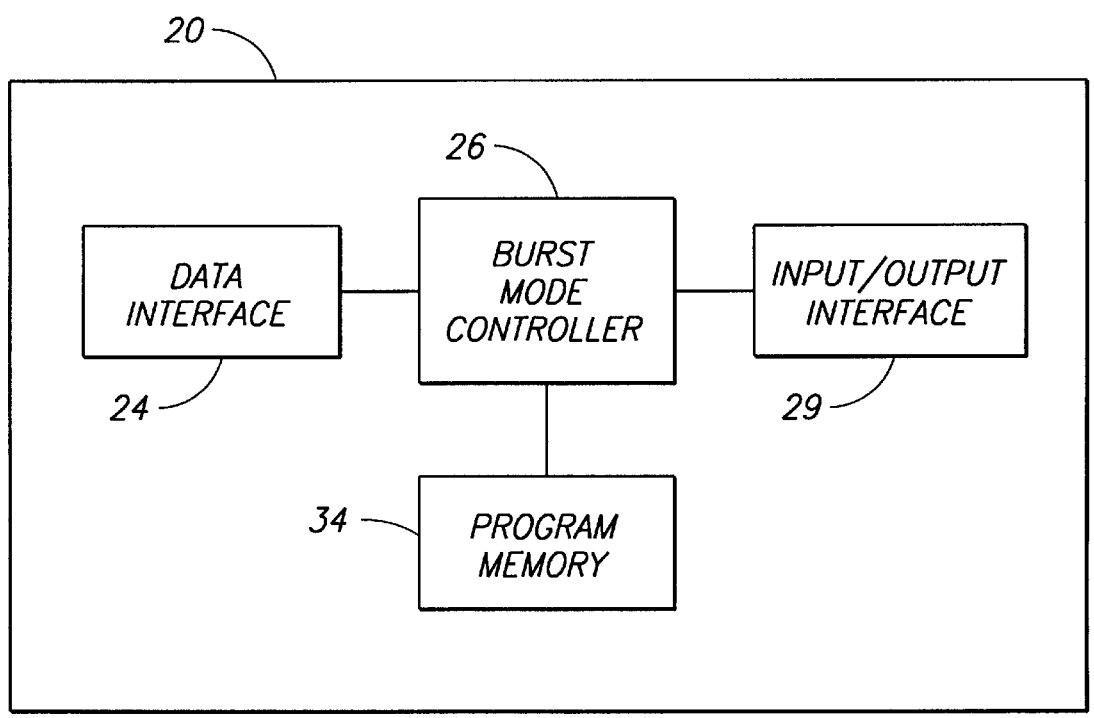
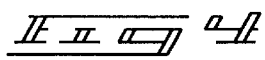

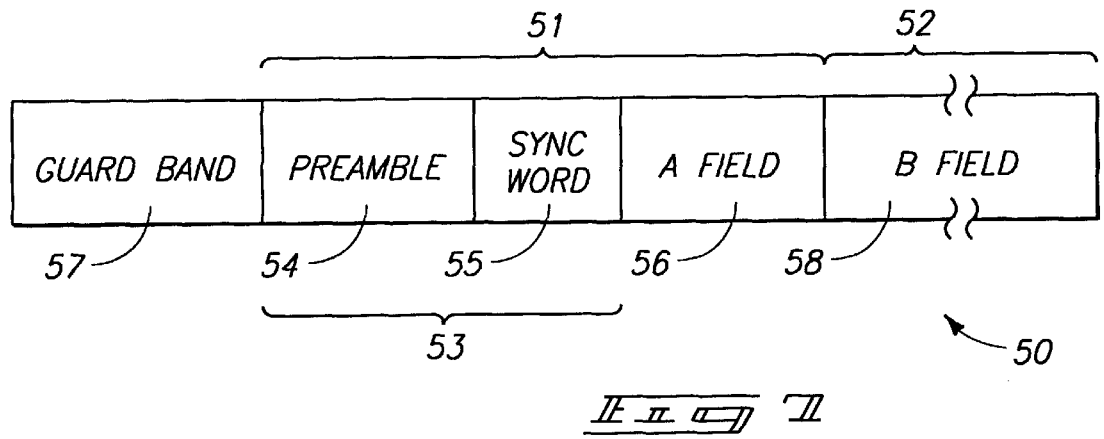
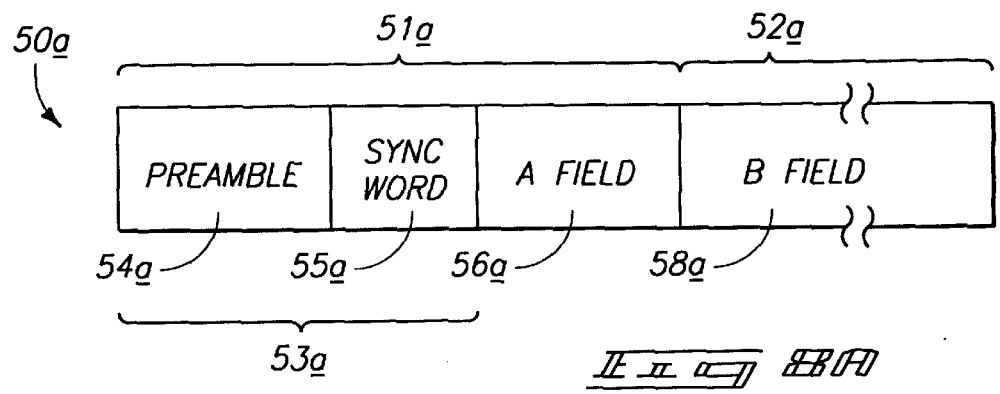
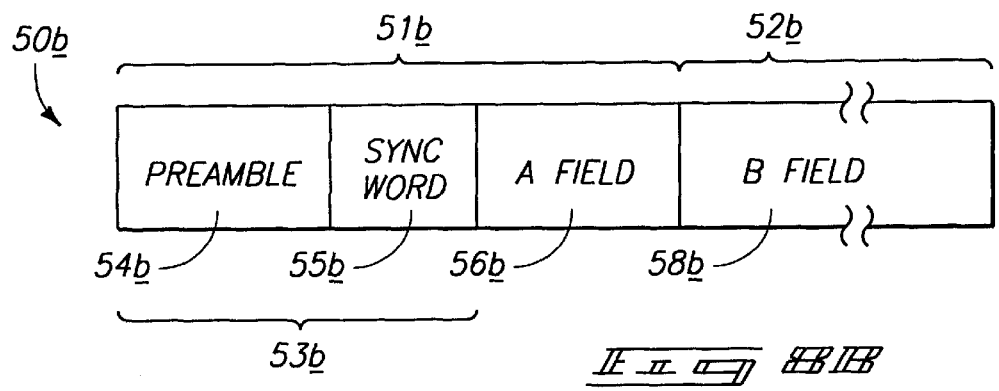

METHODS OF GENERATING A DATA STREAM, METHODS OF VALIDATING AN INTEGRATED CIRCUIT, AND METHODS OF COMMUNICATING A DATA STREAM

TECHNICAL FIELD

The present invention relates to methods of generating a data stream, methods of validating an integrated circuit, and methods of communicating a data stream.

BACKGROUND OF THE INVENTION

Generally speaking, a cordless telephone includes a handset coupled via radio connection with a base station. The base station is usually connected by wire to a traditional Public Switched Telephone Network (PSTN) or an Integrated Services Digital Network (ISDN). The development of new cordless standards which are based upon digital technology provides a broad spectrum of applications. Exemplary cordless applications include wireless Private Automatic Branch Exchange (PABX), wireless Local Area Network (LAN), Telepoint, and Radio Local Loop. Cordless standards include Digital Enhanced Cordless Telecommunications (DECT), GSM, PHS, AMPS, IS54 or IS95. The digital cordless telephones represent a valid alternative to cellular phones in densely populated areas.

DECT is a cordless standard defined as a Multicarrier (MC), Time Division Multiple Access (TDMA)/Time Duplex Division (TDD) system. Time is divided in the DECT standard into frames of 10 ms. Each frame is divided into 24 full slots. The standard also allows for half slots and double slots of data.

In order to be able to support multiple channels, a DECT base station compresses and transmits 10 ms of speech during one full slot. This means that 10 ms of speech are actually sent over the radio in 416 μs. Every active connection makes use of two slots, one for receiving and one for transmitting. For example, if the slots in a DECT frame are numbered from 0 to 23, the first 12 slots (0–11) are used for transmission from the base station to the handset and the remaining slots are used for handset to base station transmission. A base station transmitting to a given handset in slot N will always receive from this handset in slot N plus 12, or in other words, half a frame later. Accordingly, a DECT base station is able to support up to 12 active voice connections at the same time.

The total number of bits within a conventional DECT slot is 480. With 24 slots and a 10 ms frame, a gross bit rate of 1.152 Mbits/s is provided. Once the DECT slot has been formatted, it is transmitted using one of 10 radio frequencies specified within the DECT standard. For example, the frequency band assigned to DECT in Europe is between 1,880 and 1,900 MHz, with a spacing of 1.728 kHz between adjacent frequencies. The transmission frequency for each channel is chosen dynamically based upon a Radio Signal Strength Indication (RSSI). Each active slot in the DECT frame may be transmitted and received on any of the 10 frequencies.

It is often desirable to program slots transmitted between the communication devices. For example, the programmed slots may be utilized to test the operation of each of the communication devices (i.e. handset and base station) within a communication system to confirm proper transmission and reception of data signals therebetween. Such testing may be utilized to validate the operation of components within the respective devices.

BRIEF DESCRIPTION OF THE DRAWINGS

Preferred embodiments of the invention are described below with reference to the following accompanying drawings.

FIG. 1 is a functional block diagram of a communication system.

FIG. 2 is an illustrative diagram of a frame structure.

FIG. 3 is an illustrative diagram of a slot.

FIG. 4 is a functional block diagram of a communication device.

FIG. 7 is an illustrative diagram of a DECT slot.

FIGS. 8a, 8b are illustrative diagrams of a first slot and a second slot, respectively.

DETAILED DESCRIPTION OF THE PREFERRED EMBODIMENTS

Figure 5:
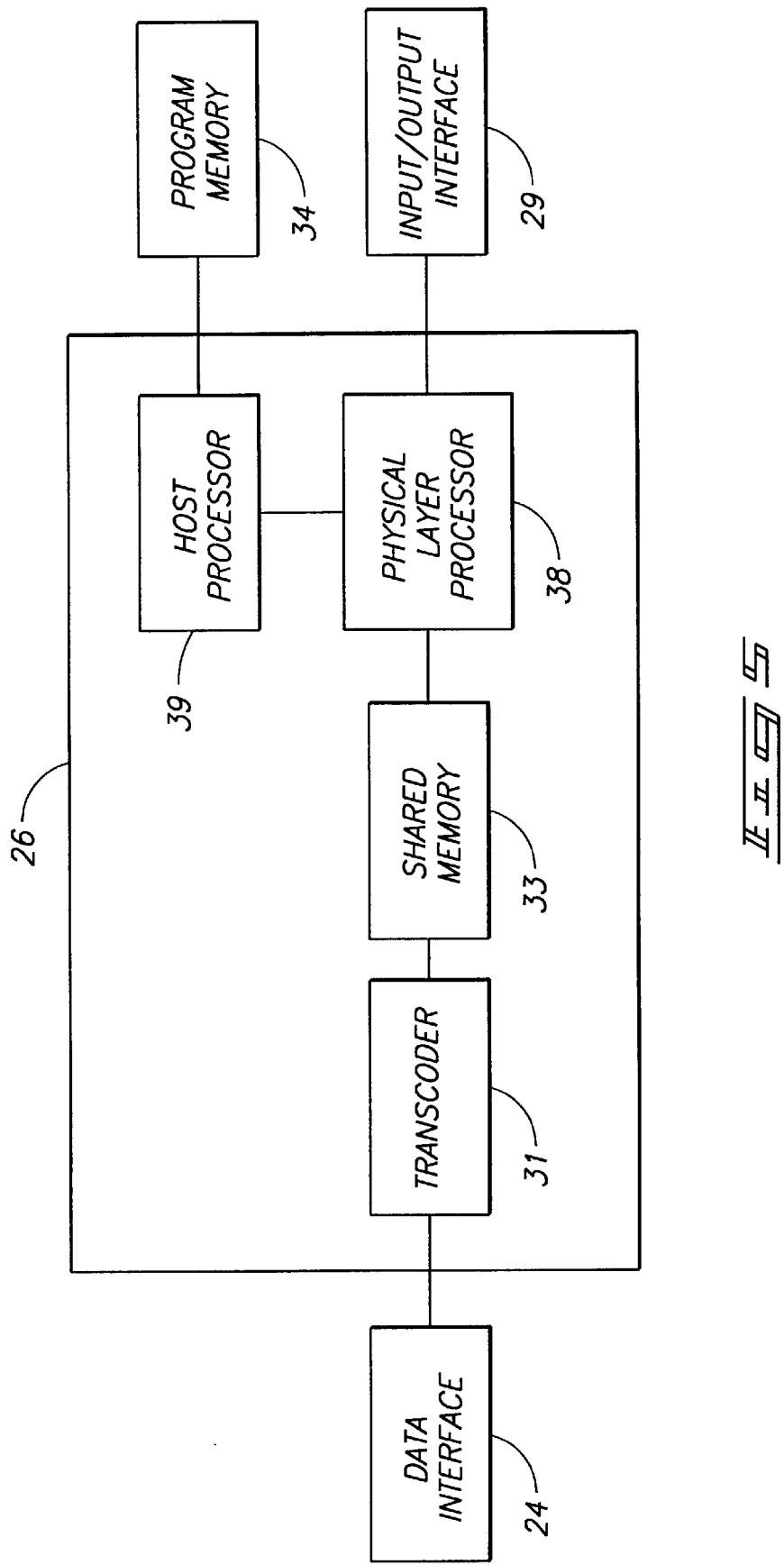
FIG. 5 is a functional block diagram of a burst mode controller of the communication device shown in FIG. 4.

This disclosure of the invention is submitted in furtherance of the constitutional purposes of the U.S. Patent Laws "to promote the progress of science and useful arts" (Article 1, Section 8).

In accordance with one aspect of the present invention, a method of generating a data stream comprises: generating a first slot having a first data field; generating a second slot; and providing the second slot within the first data field of the first slot.

Another aspect of the present invention provides a method of generating a data stream comprising: generating a first DECT slot having a first synchronization field, a first A field and a first B field; generating a second DECT slot having a second synchronization field, a second A field, and a second B field; and providing the second DECT slot within the first B field of the first DECT slot.

In accordance with another aspect of the present invention, a method of generating a data stream comprises: generating a first slot having a first synchronization field and a first data field; generating a first preamble and a first synchronization word; generating a second slot having a second synchronization field and a second data field; providing the first preamble and the first synchronization word within the first synchronization field; and providing the second slot within the first data field.

Yet another aspect of the present invention provides a method of validating an integrated circuit comprising: providing an integrated circuit; generating a first slot externally of the integrated circuit, the first slot having a first data field; generating a second slot externally of the integrated circuit; providing the second slot within the first data field of the first slot; and receiving the second slot from within the first slot in the integrated circuit.

In accordance with another aspect of the present invention, a method of communicating a data stream comprises: generating a first slot having a first data field; generating a second slot; providing the second slot within the first data field of the first slot; transmitting the first slot after providing the second slot within the data field; and after the transmitting, receiving the second slot.

While some aspects of the present invention are described below with reference to the DECT standard, it is to be understood that the present invention is not limited thereto. The present invention is also applicable to communication systems which utilize other communication protocols or standards, including wired communication systems and other systems.

Referring to FIG. 1, a communication system 21 is shown. The communication system 21 operates to transfer data between two points or locations through the use of a plurality of communication devices 20a, 20b and a communication medium 22. A data signal, also referred to as a data stream, is transferred from a transmitting communication device 20a to at least one appropriate receiving communication device 20b. The communication devices 20a, 20b as described herein operate in a transmitting mode and receiving mode respectively. However, it is preferred to configure communication devices 20a, 20b such that each may be selectively operated in either a transmit or receive mode of operation.

The data signal may be transferred via any suitable communication medium 22. Radio frequency signals and a conductive link are exemplary communication media for conveying the transmitted data signal. For many applications it is preferred to provide radio frequency communication. However, while performing some testing applications, the communication devices 20a, 20b may be hard wired or otherwise physically connected.

The first communication devices 20a, 20b are operable to manipulate the data stream into a plurality of slots in accordance with the communication protocol or standard being utilized. Portions of the data stream are provided into respective slots. The communication system 21 is configured to transmit data within the slots in accordance with a predefined frame structure. The definition of slot herein is intended to cover any data packet or information packet.

Referring to FIG. 2, one such frame structure 25 is time division multiple access (TDMA). The TDMA method enables n communication devices to access an assigned bandwidth W on a time basis. The individual communication devices access the full bandwidth but for only a fraction of the time on a periodic basis. One communication device is given a slot in a frame having n slots for communicating its respective data.

The frame structure 25 shown in FIG. 2 comprises a DECT multiframe 27 which includes a plurality of DECT frames 28. In accordance with the DECT standard, each multiframe 27 comprises 16 DECT frames 28. Each DECT frame 28 comprises a plurality of slots 10. In particular, a DECT TDMA frame 28 comprises 24 slots.

An exemplary slot 10 for transmitting data is shown in FIG. 3. The slot 10 includes a plurality of predefined fields including an auxiliary field 12 and a data field 13. A guard band 11 may be provided intermediate adjacent slots to allow for frequency switching and delay handling. Providing guard band 11 is preferred inasmuch as received slots may be subject to possible delay with regard to frame timing. In particular, the last bits of the current slot may interfere with the first bits of the following slot if no guard band 11 is provided.

The auxiliary field 12 contains operational information required by the particular communication standard or protocol being utilized. When utilizing the DECT standard, it is typical to include synchronization information, begin transmission information, and control information which is retained in the auxiliary field 12. The control information includes DECT protocol messages and information regarding the content of the data field 13. The data field 13 contains the information (e.g., speech data) to be transmitted within the telecommunications system. The data within the data field 13 may be compressed enabling the transmission of 10 ms of speech in 416 $\mu$s.

Referring to FIG. 4, an embodiment of a communication device 20 is shown. The illustrated communication device 20 includes a data interface 24, burst mode controller (BMC) 26, program memory 34 and input/output interface 29. The data interface 24 is operable to either receive a data signal to be transmitted by a communication device 20, or output a data signal received by the communication device 20.

For example, the data signal to be transmitted may be either provided to the communication device 20 from an external source, or alternatively, generated internally. Such an external source may include a telecommunications network such as a PSTN or ISDN. In addition, an external computer may be coupled with the data interface 24 and configured to download data thereto. Alternately, an internal analog input device, such as a microphone, may be utilized to generate the data signal to be transmitted. Regardless of source, the transmit data signal is applied to data interface 24, and subsequently to burst mode controller 26 and input/output interface 29 for transmission within the communication system 21.

Data signals received by the communication device 20 are applied to the input/output interface 29, and subsequently to burst mode controller 26 and data interface 24. Data interface 24 is preferably coupled with a device operable to accept the received data signal. Such devices include an appropriate telecommunications network or an analog speaker. In either instance, the data interface 24 operates to output the received data signal.

The burst mode controller 26 is provided intermediate data interface 24 and input/output interface 29. Burst mode controller 26 contains digital architecture configured to implement the communication protocol utilized for transmitting and receiving the data signal. Burst mode controller 26 is operable to manipulate the data signal transmitted or received within each communication device 20.

In a transmit mode of operation, data interface 24 applies the transmit data signal to burst mode controller 26. Burst mode controller 26 accesses the data signal at appropriate times within the frame and generates a plurality of slots therefrom. Once formed, the transmit slots are stored within an internal buffer and applied to the input/output interface 29 for transmission. The slots are transmitted via the communication medium 22 to an appropriate communication device 20 configured to receive the data signal. The input/output interface 29 may be coupled with a radio frequency transceiver or fiber optic transceiver if the communication medium 22 comprises radio frequency signals or fiber optic cable, respectively.

In a receive mode of operation, the data signal is received via the communication medium 22 (FIG. 1) into the input/output interface 29 (FIG. 4). The data signal, in the form of slots, is applied to the burst mode controller 26 within the receiving communication device 20. Burst mode controller 26 transforms the slots received into a corresponding data stream which is output to the data interface 24 for application to the speaker, telecommunications network, external computer, etc.

Referring to FIG. 5, burst mode controller 26 comprises a transcoder 31, shared memory component 33, physical layer processor (PLP) 38 and host processor 39. Host processor 39 is configured to execute software which implements the selected communication protocol. Host processor 39 has access to program memory 34 which is operable to store code utilized to control the data manipulation operations of the physical layer processor 38. For example, program memory 34 is configured to store encryption code and communication protocol (e.g., DECT) code. Program memory 34 may also be configured to store code for operating an internal radio controller if data signals are transmitted and received by radio frequency signal.

A transmit data signal received by the data interface 24 is applied to the transcoder 31 within the burst mode controller 26. The bit stream rate of the data signal is preferably minimized within transcoder 31. Transcoder 31 is optional and may be bypassed. More specifically, transcoder 31 is preferably used for voice transmission/reception and may be bypassed during digital data transmission.

Transcoder 31 is preferably an Adaptive Differential PCM transcoder. The data rate of the ADPCM samples is 32 kbit/s. An exemplary preferred embodiment for transcoder 31 is specified by the International Telegraph and Telephone Consultative Committee (CCITT) Blue Book G726 recommendation. The transcoder 31 applies the transmit data signal to shared memory 33.

The physical layer processor 38 may be implemented as an integrated circuit configured to retrieve the data signal from the shared memory 33 and provide data manipulation thereof. One embodiment of a physical layer processor 38 is disclosed in U.S. patent Application, Ser. No. 08/661,606, entitled "Asychoronouse Timing Generator in DECT Base Band Products", filed Jun. 11, 1996, naming Michel Eftimakis and Gianmaria Mazzucchelli as inventors, assigned to the assignee hereof, and is incorporated herein by reference.

Physical layer processor 38 provides data frame construction of the transmit data signals for utilization within the communication protocol. Responsive to instruction from host processor 39, physical layer processor 38 retrieves the data signal to be transmitted from the shared memory 33 and provides portions of the transmit data signal into data fields 13 within corresponding slots 10. Physical layer processor 38 interfaces with the input/output interface 29 and is operable to apply the transmit slots containing the data signal thereto.

Physical layer processor 38 also manipulates the received data signal to retrieve the original data stream applied to the transmitting communication device 20. The receive data stream, in the form of slots, is applied to the burst mode controller 26 wherein the data is extracted from the data fields 13 of the slots 10. Burst mode controller 26 stores ADPCM 4-bit samples within the shared memory 33. The transcoder 31 retrieves the data samples from the shared memory 33 and converts the samples into the 64 kbit/s data signal. The data signal is thereafter applied to the data interface 24.

Figure 6:
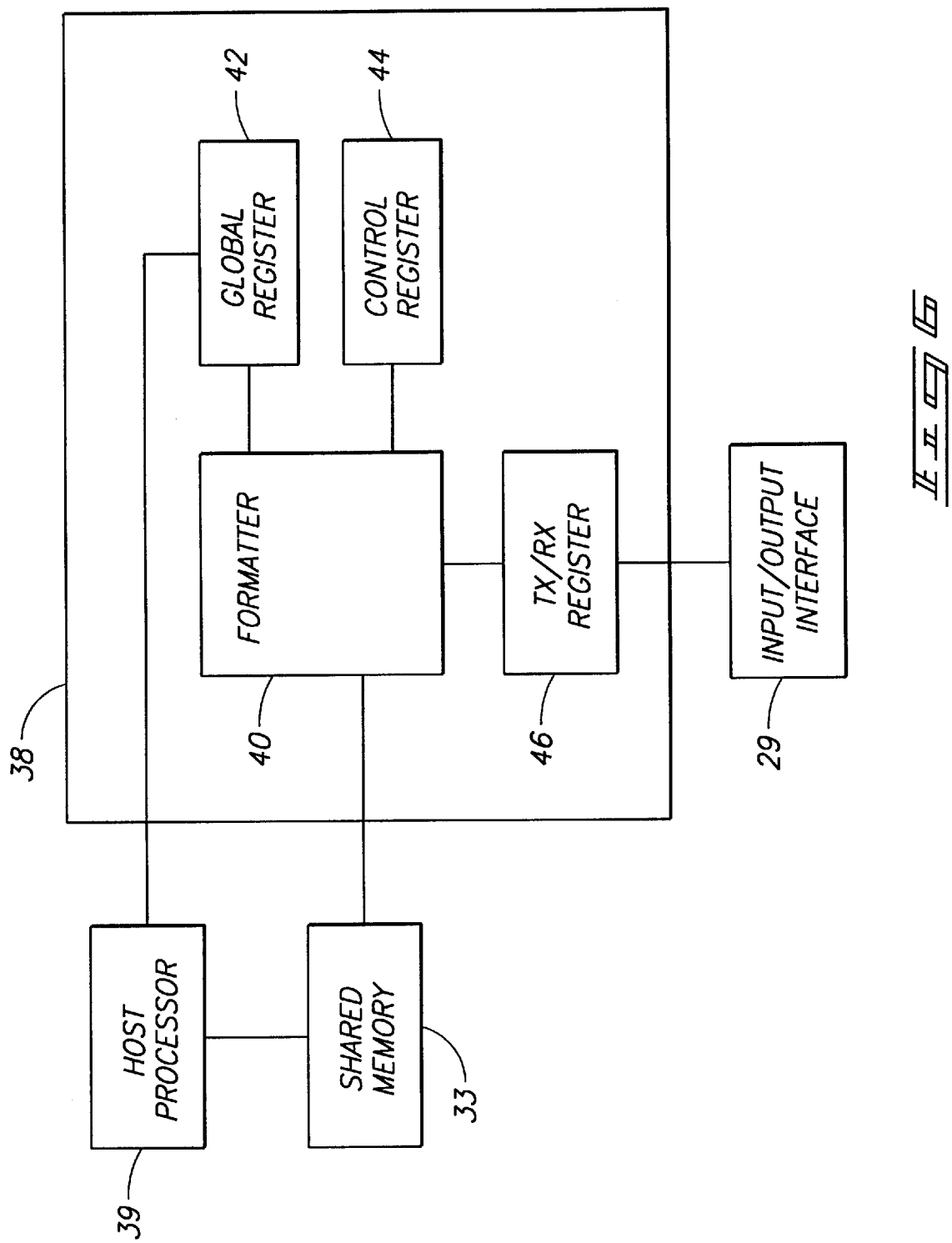
FIG. 6 is a functional block diagram of a physical layer processor of the burst mode controller shown in FIG. 5.

Referring to FIG. 6, an embodiment of the physical layer processor 38 is shown. Physical layer processor 38 includes a formatter 40, global register 42, control register 44, and transmit/receive (Tx/Rx) register 46. Formatter 40 is operable in a transmission mode to access the data signal stored in shared memory 33 and form transmission slots 10 therefrom. Formatter 40 stores the slots 10 within transmit/receive register 46 for application to the input/output interface 29. In the receive mode, formatter 40 receives transmitted slots from input/output interface 29 and transmit/receive register 46. Formatter 40 extracts the data from the data fields 13 of the slots 10. Formatter 40 reconstructs the transmitted data stream and stores the data stream within the shared memory 33.

Formatter 40 performs slot construction and data extraction operations responsive to instruction from the host processor 39. In particular, host processor 39 generates slot control blocks which contain control signals for performing the data signal manipulation operations. For example, the slot control block identifies the upcoming slot and the formatter 40 performs either transmit operations wherein a portion of the data stream is placed in an appropriate slot for transmission, or receive operations wherein the data is extracted from the received slot. The host processor 39 stores the slot control blocks in a dedicated location of the shared memory 33. The formatter 40 transfers the slot control block to the control register 44 for processing of the current slot. The formatter 40 accesses appropriate control signals within the slot control block for the upcoming slot.

The host processor 39 also writes control signals to the global register 42. For example, the host processor 39 controls the supply of power to the formatter 40. In addition, the host processor 39 can write commands to the global register 42 for controlling encryption and scrambling of the data stream within various data signal manipulation devices (not shown).

During a transmit mode of operation, physical layer processor 38 operates to manipulate the data stream into the slot/frame format for transmission. On the receive side, physical layer processor 38 extracts the portions of the data stream from the slots and reconstructs the original data stream.

It is often desirable to control the contents of each field within the slot 10 (or group of slots) being transmitted. For example, providing programmability of the slot 10 enables validation of the operation of the physical layer processor 38 within the communication device 20 operating in receive mode. It is desirable to permit complete programmability of the contents of a particular slot, including the auxiliary field 12 as well as the data field 13. However, the contents of the auxiliary field 12 are typically generated automatically by the physical layer processor 38 and not subject to control or programming. One method in accordance with the present invention which provides complete programmability of slot 10 is described hereafter.

The method of providing such programmability is described herein with reference to the Digital Enhanced Cordless Telecommunications (DECT) standard. The present invention grew out of needs concerned with DECT. The present invention is not limited to DECT. The present invention may be utilized with other communication protocols which utilize slot structures for the transmission of data.

Referring now to FIG. 7, an exemplary DECT slot 50 is shown. The physical layer processor 38 generates the DECT slot 50. A guard band 57 is preferably provided intermediate adjacent slots. A typical guard band 57 includes 56 bits. The DECT slot 50 includes an auxiliary field 51 and data field 52. The auxiliary field 51 of the DECT slot 50 comprises a synchronization field (also referred to as "S" field) 53 and an A field 56. The synchronization field 53 includes a preamble 54 of 16 bits and a synchronization word 55 of 16 bits. The data field 52 comprises a B field 58 which is configured to store a portion of the data stream being transmitted. The physical layer processor 38 generates the preamble 54, A field 56 and synchronization word 55.

The bits within the synchronization field 53 are typically the same in each transmit slot and each frame of a respective communication device 20. The synchronization field 53 is used on the receive side by the receive communication device 20 to synchronize to the timing of the corresponding transmit communication device 20. Additionally, preamble 54 and synchronization word 55 are used by a receiving communication device 20 to detect the beginning of a transmission from a corresponding communication device 20. Communication devices 20a, 20b typically generate different preambles 54 and synchronization words 55.

The A Field 56 typically comprises 64 bits and is transmitted after the synchronization word 55. The A Field 56 contains an A field word having DECT, or other communication protocol, messages exchanged between the communication devices 20a, 20b as well as information on the content of B Field 58 which follows thereafter.

The B Field 58 is typically 320 bits which corresponds to 80 4-bit ADPCM (Adaptive Differential Pulse Code Modulation) samples and contains the real data being transmitted (e.g., 10 ms of speech). In particular, the physical layer processor 38 places a portion of the data stream within the B field 58 for transmission. The B field 58 of the DECT slot 50 preferably contains cyclic redundancy check (CRC) fields containing redundancy bits to verify transmission of digital data.

A method in accordance with the present invention of generating a programmable slot is described with reference to FIGS. 8–9. While an exemplary first DECT slot 50a and an exemplary second DECT slot 50b are shown, it is to be understood that the first slot 50a and second slot 50b may be defined in accordance with another communication protocol. The method according to the present invention of providing a completely programmable slot is not limited to DECT applications.

Referring to FIG. 8a, first DECT slot 50a comprises a first auxiliary field 51a and first data field 52a. First auxiliary field 51a includes a first synchronization "S" field 53a and first A field 56a. First synchronization field 53a comprises a first preamble 54a and first synchronization word 55a. First A field 56a contains a first A field word. First data field 52a comprises a first B field 58a.

Referring to FIG. 8b, second slot 50b comprises a second auxiliary field 51b and second data field 52b. Second auxiliary field 51b includes a second Synchronization "S" field 53b and second A field 56b. Second synchronization field 53b comprises a second preamble 54b and second synchronization word 55b. Second A field 56b contains a second A field word. Second data field 52b comprises a second B field 58b.

Figure 9:
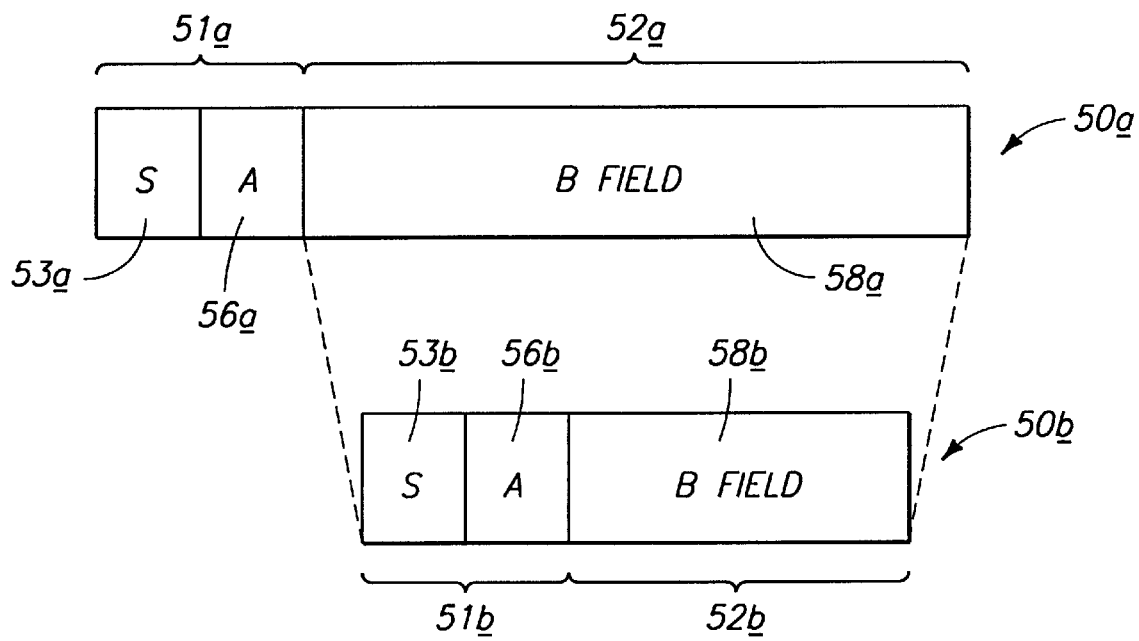
FIG. 9 is an illustrative diagram of providing the second slot within a data field of the first slot in accordance with the present invention.

Referring to FIG. 9, second slot 50b is preferably fully programmable including the auxiliary field 51b and data field 52b thereof. Second slot 50b is programmed and stored within an appropriate location of shared memory 33. In particular, second slot 50b may be externally generated and stored within shared memory 33. Thereafter, physical layer processor 38, responsive to an appropriate slot control block, can read the second slot 50b from the location within shared memory 33 and place or provide it within the first data field 52a of the first slot 50a. The entire second slot 50b is provided within the first data field 52a of the first slot 50a. Second slot 50b may be referred to as a "virtual slot" within the first slot 50a. Encryption and scrambling operations are preferably disabled permitting complete programmability of the second slot 50b provided within the first slot 50a. The second slot 50b may be smaller than the first data field 52a.

The first communication device 20a may be configured to transmit the first slot 50a having the second slot 50b therein. The second communication device 20b is configured for synchronization with the second slot 50b. In particular, host processor 39 of the receiving communication device 20b is operable to generate a slot control block configured to obtain synchronization from the second synchronization word 55b of the second slot 50b. Accordingly, the first auxiliary field 51a of the first slot 50a (including first S field 53a and first A field 56a) is discarded and not utilized for synchronization. The first auxiliary field 50a, including S field 53a and A field 56a, is preferably not utilized inasmuch it contains information which cannot be controlled. Subsequent to synchronization with the second slot 50b, the physical layer processor can read or receive the second data field 52b.

The operation of the receiving communication device 20b can be validated since the entire second slot 50b received thereby is programmable. In other words, providing a programmable second slot 50b permits verification and validation of the operation of the physical layer processor 38 of receiving communication device 20b within predefined standards. While the frame and time-slot structures are primarily utilized in cordless applications, the communication devices 20a, 20b are preferably coupled by direct connection (i.e., hard wired) during validation and other appropriate testing operations.

As mentioned above, the B field 58 of a typical DECT slot 50 comprises 320 bits. However, the length of the DECT slot 50 and the contents therein may be varied. In particular, the DECT standard permits transmission of half slots and double slots. This is preferred to permit flexibility and provide the capability of transmitting a full DECT slot or even a double DECT slot within the first B field 58a of the first DECT slot 50a.

The above-described method according to the present invention of validating an integrated circuit (i.e. physical layer processor 38) is one aspect of the present invention. It is to be understood that the present invention is not limited to such validation operations. The present invention relates to any application wherein the contents of a slot are programmable.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of validating an integrated circuit, comprising:

providing an integrated circuit;

generating a first slot externally of the integrated circuit, the first slot having a first data field;

generating a second slot externally of the integrated circuit;

providing the second slot within the first data field of the first slot;

receiving the second slot from within the first slot in the integrated circuit; and synchronizing the integrated circuit using only the second slot.

2. The method according to claim 1 wherein the second slot includes a preamble and a synchronization word.

3. The method according to claim 2 further comprising synchronizing the integrated circuit with the synchronization word.

4. The method according to claim 1 wherein the first slot includes a first auxiliary field and the second slot includes a second auxiliary field and a second data field.

5. The method according to claim 4 further comprising discarding the first auxiliary field after providing the second slot within the first data field of the first slot.

6. The method according to claim 4 further comprising providing a second synchronization word within the second auxiliary field.

7. The method according to claim 6 further comprising reading data from the second data field responsive to the second synchronization word.

8. The method according to claim 1 wherein the first slot comprises a first DECT slot and the second slot comprises a second DECT slot.

9. The method according to claim 1 wherein the generating the second slot comprises programming the entire second slot.

10. A method of communicating a data stream, comprising:

generating a first slot having a first data field;

generating a second slot;

providing the second slot within the first data field of the first slot;

transmitting the first slot and the second slot after providing the second slot within the data field;

after the transmitting, receiving the second slot; and establishing synchronization only with the second slot.

11. The method according to claim 10 wherein the second slot includes a preamble and a synchronization word.

12. The method according to claim 11 further comprising synchronizing an integrated circuit with the synchronization word.

13. The method according to claim 11 wherein the receiving is responsive to the synchronization word.

14. The method according to claim 10 wherein the first slot includes a first auxiliary field and the second slot includes a second auxiliary field and a second data field.

15. The method according to claim 14 further comprising reading the second data field following the receiving.

16. The method according to claim 14 further comprising discarding the first auxiliary field after the transmitting.

17. The method according to claim 10 wherein the first slot comprises a first DECT slot and the second slot comprises a second DECT slot.

18. The method according to claim 10 wherein the transmitting comprises transmitting the first slot including an auxiliary field and the second slot including an auxiliary field and a data field.

19. The method according to claim 10 further comprising programming the entire second slot.

20. A method of communicating a DECT data stream, comprising:

generating a first preamble, a first synchronization word and a first A field word;

generating a first DECT slot having a first synchronization field, a first A field and a first B field;

providing the first preamble and the first synchronization word within the first synchronization field;

providing the first A field word within the first A field;

generating a second preamble, a second synchronization word and a second A field word;

programming a second DECT slot having a second synchronization field, a second A field and a second B field;

providing the second preamble and the second synchronization word within the second synchronization field;

providing the second A field word within the second A field;

providing the second DECT slot within the first B field;

transmitting the first DECT slot and the second slot after providing the second DECT slot within the first B field, wherein the transmitting comprises transmitting the first slot including an auxiliary field and the second slot including an auxiliary field and a data field;

discarding the first synchronization field after the transmitting;

synchronizing using only the second synchronization word; and receiving the second DECT slot after the synchronizing.

21. A communication system comprising:

a first communication device configured to generate a first slot and a second slot individually having a data field and a synchronization field, and to provide the second slot within the data field of the first slot, the first communication device being further configured to communicate the first slot having the second slot within the data field of the first slot; and a second communication device configured to communicate with the first communication device, to receive the first slot including the second slot and to synchronize only using the synchronization field of the second slot.

22. The system according to claim 21 wherein the processor is configured to generate the first slot and the second slot in accordance with the DECT protocol.

23. The system according to claim 21 wherein the synchronization field of the second slot is programmable within the first communication device.

* * * * *